US006636292B2

(12) United States Patent
Roddy et al.

(10) Patent No.: US 6,636,292 B2
(45) Date of Patent: Oct. 21, 2003

(54) PRINTING APPARATUS FOR PHOTOSENSITIVE MEDIA HAVING A HYBRID LIGHT SOURCE

(75) Inventors: James E. Roddy, Rochester, NY (US); Robert J. Zolla, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/946,436

(22) Filed: Sep. 5, 2001

(65) Prior Publication Data

US 2003/0058419 A1 Mar. 27, 2003

(51) Int. Cl.[7] .......................... G03B 27/52; G03B 27/54
(52) U.S. Cl. .............................. 355/32; 355/67; 355/70
(58) Field of Search .............................. 355/32, 37, 67, 355/70, 71; 358/509, 510; 347/239, 255; 353/31

(56) References Cited

U.S. PATENT DOCUMENTS 4,812,900 A 3/1989 Kadowaki et al. .......... 358/509
4,930,008 A 5/1990 Suzuki et al. ............... 358/500
5,528,050 A 6/1996 Miller et al. ................ 250/585
5,704,700 A * 1/1998 Kappel et al. ................ 353/31
5,757,348 A * 5/1998 Handschy et al. ............ 345/89
5,808,800 A * 9/1998 Handschy et al. .......... 359/630
5,971,545 A * 10/1999 Haitz .......................... 353/31
6,005,722 A 12/1999 Butterworth et al. ....... 359/712
6,104,510 A 8/2000 Hu et al. ..................... 358/509
6,188,426 B1 * 2/2001 Nakamura .................. 347/239
6,215,547 B1 4/2001 Ramanujan et al. .......... 355/67
6,396,565 B1 * 5/2002 Yamamoto et al. ........... 355/41
6,398,389 B1 * 6/2002 Bohler et al. ............... 362/293
2002/0141069 A1 * 10/2002 Hubby, Jr. .................. 359/634

* cited by examiner

*Primary Examiner*—Rodney Fuller
(74) *Attorney, Agent, or Firm*—Nelson Adrian Blish

(57) ABSTRACT

A writing apparatus (10) for forming images from digital data onto color motion picture film or other photosensitive media (32), the apparatus employing a single spatial light modulator (30) and having a hybrid light source (20) with three components: a red laser (40), a green laser (42), and one or more blue LEDs (18). Each component of the light source is adapted to the sensitometric response characteristics of a particular motion picture film type. The apparatus allows high-speed imaging to photosensitive media (32).

75 Claims, 5 Drawing Sheets

PRINTING APPARATUS FOR PHOTOSENSITIVE MEDIA HAVING A HYBRID LIGHT SOURCE

FIELD OF THE INVENTION

This invention generally relates to digital film writing apparatus for writing onto photosensitive media and more particularly relates to an apparatus for writing images from digital data onto motion picture film.

BACKGROUND OF THE INVENTION

In conventional motion picture film preparation, a master negative film is developed and prepared as an intermediate from which copies can be mass-produced as print films. One example of a motion picture printer using conventional optical methods for producing print films is the Model 6131 Series Printer manufactured by BHP Incorporated, Chicago, Ill. Using such conventional methods and optical equipment, projection-quality print films for distribution can be produced economically, at high speed.

With the advent of digital motion picture imaging, conventional optical methods could still be used for print film preparation. That is, a master negative film can be prepared using digital imaging equipment. This same master negative film could then serve as an intermediate for print film production, following the conventional sequence used for film production using optical equipment. However, it can be well appreciated that there are benefits to film production methods that offer increased speed, lowered cost, and increased versatility over earlier methods. As one example, conventional methods do not allow imaging directly to print film economically. Using conventional equipment, an intermediate film is required, with an accompanying loss of some measure of image quality in transfer between the intermediate negative film and the final print film.

It is recognized to those knowledgeable in the film production arts that slow print speeds keep digital film production at a disadvantage. Conventional digitally-based motion picture film imaging systems, using CRT writers or using lasers in conjunction with a spinning polygon, yield writing output speeds measured in multiple seconds per frame. However, high-speed film duplication using older optical exposure methods achieves speeds measured in multiple frames per second. Thus, in order to provide a competitive alternative to optical film production methods, digital film production methods must improve upon current printing times.

For motion picture film and other photosensitive media in general, spatial light modulators show considerable promise as image forming components. Originally developed for digital projection equipment, spatial light modulators are being more widely used for imaging onto film and other photosensitive media. Exemplary spatial light modulators used for this purpose include Liquid Crystal Devices (LCDs) from Victor Company of Japan (JVC), Yokohama, Kanagawa, Japan, and digital micromirror devices (DMDs) from Texas Instruments, Dallas, Tex. A spatial light modulator can be considered essentially as a two-dimensional array of light-valve elements, each element corresponding to an image pixel. Each array element is separately addressable and digitally controlled to modulate light. An LCD, for example, modulates light intensity for a pixel by modulating the polarization state of light from the array location corresponding to that pixel. For operation, the LCD must be provided with plane polarized light.

Both LCD and DMD arrays have advantages over other types of image-forming devices. Because LCD and DMD arrays can image a complete frame at a time, there is minimal mechanical complexity and thus, lower cost. Thus, LCDs and DMDs enjoy complexity and cost advantages, particularly in contrast to writing systems using lasers with spinning polygons.

Though not as widely used, other types of spatial light modulators used for photosensitive media include gated light valves such as lead lanthanum zirconate titanate (PLZT) light valves. The gated light valve is essentially an array of light-transmitting elements arranged in linear fashion to provide a 1×m pixel array, where the width of the array, m, is typically in the range of a few thousand pixels. One example of a gated light valve is a Micro Light Valve Array (MLVA) used in the Noritsu model QSS-2711 Digital Lab System, manufactured by Noritsu Koki Co., located in Wakayama, Japan. The same basic imaging principle used with spatial light modulators applies, whereby individual elements in the array vary in the intensity of light emitted. However, using a linear array provides only one line of the two-dimensional image at a time, and therefore requires movement of the photosensitive media relative to the printhead in order to expose a complete frame.

There are a number of alternative light sources for use with a spatial light modulator in an apparatus that images onto a photosensitive medium, including the following:

(a) tungsten or halogen lamp. These sources, although used in many types of film development and processing systems, are not advantageous for high-speed film printing using spatial light modulators. Substantial filtering and polarization optics would be required to adapt lamp sources to spatial light modulators, with concomitant loss of brightness. Shuttering components would be necessary for color printing using multiple sources. Heat management would also be necessary for tungsten or halogen sources.

(b) LED. These light sources are low cost and have favorable response speeds where light sources must be shuttered. However, single LEDs do not generally provide sufficient brightness for high-speed imaging. Moreover, LEDs exhibit some amount of color "crosstalk" causing unwanted "punch-through" whereby a portion of light energy intended for imaging in one color impacts a second color. Narrowband filters could be used to prevent such crosstalk, but this would result in a significant loss of light. These disadvantages limit the acceptance of LEDs as light sources for high-speed production of motion picture films.

(c) laser. The laser has advantages including high brightness and narrow bandwidth. As a further advantage, laser output is inherently polarized, not requiring polarization conditioning by lossy components in the optical path. However, lasers are higher in cost, particularly in some wavelengths.

Overall, LEDs and lasers are more durable than lamps and provide a favorable solution for imaging systems needing light at specific wavelengths.

Color motion picture printing uses sequenced exposures at discrete red, green, and blue (RGB) wavelengths. This can complicate printing apparatus, requiring that a separate optical path be provided for each color and that the light then be recombined, such as using an X-cube, or requiring that the same optical path be time-shared or multiplexed between multiple colors. In conventional color printing systems using spatial light modulators, both separate-path and shared-path types of optical arrangements are used. U.S. Pat. No. 6,215,547 (Ramanujan et al.) discloses a shared-path optical arrangement for a printer using a single spatial light modulator, in which the different colors used for exposure are multiplexed through the same optical path. As with any type of optical apparatus, it is recognized that there are advantages to design of systems requiring a minimal number of components.

It is worthwhile to note that color film, and color photosensitive media in general, can exhibit dramatically different levels of response to light at different wavelengths. It is well established, for example, that silver-halide (AgX) emulsions are generally much more sensitive to light radiation within the blue spectrum than within the red spectrum. These differences in film response by wavelength can be plotted as is shown in the example of FIG. 4 that shows, for a typical motion picture intermediate film, the relation of the log of film sensitivity to wavelength.

Given photosensitive media characteristics as shown in the example of FIG. 4, a conventional approach followed in intermediate film imaging design has been to consider and design to accommodate the worst-case sensitometric response. Thus, for example, if a single light source were used with filters, such a light source would require substantial power for imaging the red color component while requiring much less power for imaging the blue color component. This adds to the cost of the imaging system and reduces overall system efficiency.

When using LEDs as light sources, one method for providing the needed light intensity for each component color is to use an appropriate number of LEDs for each color. For example, a light source for the photosensitive medium characterized in FIG. 4 could contain more red LEDs than green or blue LEDs. FIG. 2 shows one arrangement in a light source 20 for red LEDs 14, green LEDs 16, and blue LEDs 18, where there are more than twice as many red LEDs 14 to provide the increased brightness necessary for a specific type of photosensitive medium. While this method may be appropriate for low- or intermediate-speed imaging systems, there are practical limitations due to space constraints and cone angle limitations. The need for high brightness within a limited cone angle makes it difficult to deploy the number of LEDs necessary for each color at sufficient intensity within a minimum space.

As is described above, conventional approaches to providing light sources of different colors include use of a single light source with filters, using LEDs of different colors, and using lasers of different colors. However, as has been noted, each of these approaches presents some disadvantages, including complexity, cost, heat management requirements, or disappointing performance, particularly where writing speed is important.

In the art of imaging and display systems design, it is known that a basic arrangement of components in an optical train can be adapted for use with any suitable type of light source, whether from a filtered lamp, from an LED, or from a laser. As just one example, U.S. Pat. No. 6,005,722 (Butterworth et al.) discloses an optical train and light valve design for a projection system that could be adapted, with the modification of specific components for beam conditioning and filtering, for use with a lamp, with LEDs, or with lasers. In contrast, however, hybrid illumination systems, in which different types of light sources can be combined to take advantage of beneficial characteristics of each type, have not been disclosed for projection or printing systems.

Meanwhile, hybrid light sources have been used in optical sensing applications, such as with scanners and scan heads, where it is recognized that sensors may exhibit varying degrees of response to radiation of different wavelengths. For example, U.S. Pat. No. 4,812,900 (Kadowaki et al.) uses red and green LEDs and a blue fluorescent lamp as hybrid light source for a high-speed scanner. U.S. Pat. No. 6,104,510 (Hu et al.) and U.S. Pat. No. 4,930,008 (Suzuki et al.) disclose similar hybrid illumination systems employed within optical scanners, offering cost advantages over the use of LEDs alone. U.S. Pat. No. 5,528,050 (Miller et al.) discloses a scanning head that, while not employing hybrid illumination, uses a general design that can alternately employ either laser or LED emission, depending on the usage mode.

Thus it can be seen that there would be advantages to a digital imaging apparatus that uses a hybrid illumination source for high-speed printing to photosensitive media, where the individual components of the hybrid illumination source are matched closely to the sensitization characteristics of the media.

SUMMARY OF THE INVENTION

It is an object of the present invention to provide a printing apparatus having a hybrid light source that is adapted to the sensitometric characteristics of a photosensitive medium.

In one embodiment, the present invention provides a writing apparatus for forming a color image from digital data onto a photosensitive medium, the apparatus comprising:

(a) a spatial light modulator comprising an array of pixel sites, each pixel site capable of modulating an incident light beam having a predetermined color, in order to form an array of image pixels according to said digital data; and (b) a light source for providing said incident light beam, said light source comprising:

(b1) a first laser for emitting said incident light beam having a first color;

(b2) a second laser for emitting said incident light beam having a second color; and (b3) at least one LED for emitting said incident light beam having a third color.

In a second embodiment, the present invention provides a writing apparatus for forming a color image from digital data onto a photosensitive medium, the apparatus comprising:

(a) a spatial light modulator comprising an array of pixel sites, each pixel site capable of modulating an incident light beam having a predetermined color in order to form an array of image pixels according to said digital data; and (b) a light source for providing said incident light beam, said light source comprising:

(b1) a laser for emitting said incident light beam having a first color;

(b2) at least one second color LED for emitting said incident light beam having a second color; and (b3) at least one third color LED for emitting said incident light beam having a third color.

It is an advantage of the present invention that it provides an apparatus capable of achieving higher speeds for printing motion picture film negatives when compared with conventional laser and polygon-based equipment. Laser light provides sufficient irradiance for short-duration exposure and can be switched on and off at relatively high speeds between color exposures.

It is an advantage of the present invention that it employs laser light, which is inherently polarized. Thus, there is no need for filtering or polarization of the laser light when directed toward the spatial light modulator, and no consequent filter losses.

It is a further advantage of the present invention that it minimizes the occurrence of "punch-through" by using the extremely narrow emissive wavelength band of one or more lasers.

It is a further advantage of the present invention that it allows imaging directly onto motion picture print film, without the need to prepare an intermediary negative. This provides economic advantages as well as image quality benefits, since there are fewer duplication stages and calibration can be performed for a single photosensitive medium only.

The present invention provides significant cost improvements over previous digital motion picture printing apparatus. For example, the present invention eliminates the need for a costly X-cube component in a film writer design. Further, the apparatus of the present invention requires only one spatial light modulator, instead of requiring a separate spatial light modulator for each color component. In contrast to the previous apparatus that uses a writing laser with a spinning polygon and complex, costly support hardware and timing components, the apparatus of the present invention is mechanically simple and economical. When compared against design approaches that exclusively employ laser light, the present invention eliminates the need for use of a blue laser, which is comparatively costly and is less reliable than LEDs, having a shorter usable life span.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
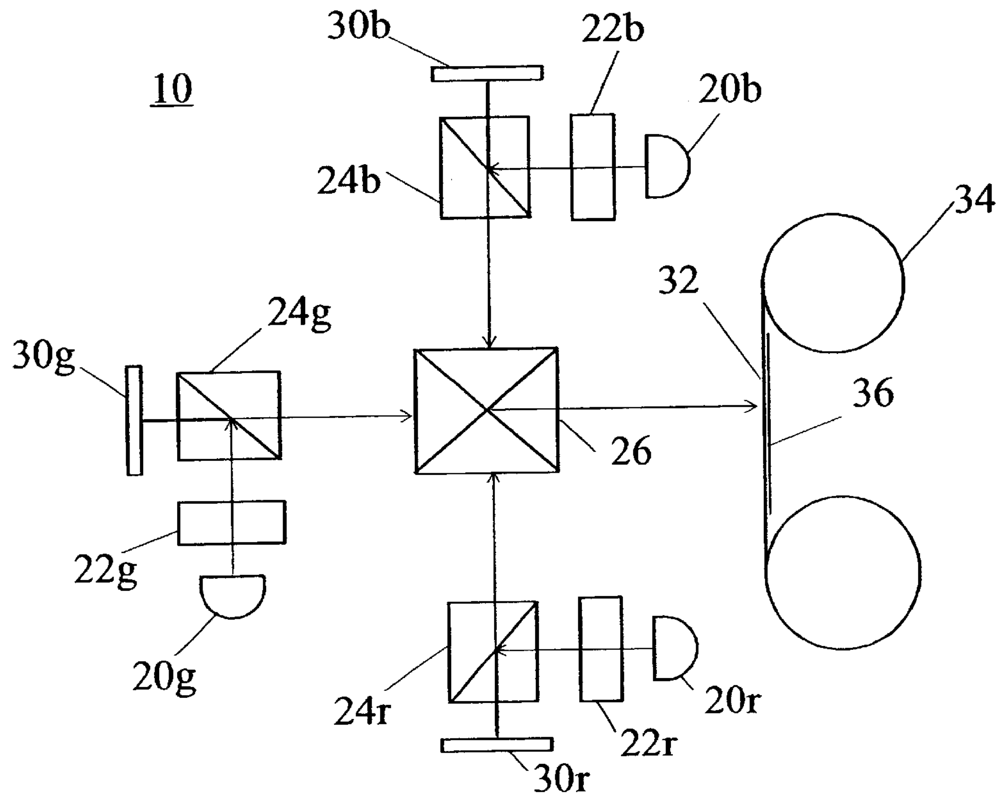
FIG. 1 (Prior Art)
FIG. 1 is a block diagram showing the major optical components in a prior art film writer using a spatial light modulator and a light source for each component color and an X-cube for combining modulated color illumination.

Referring to FIG. 1, there is shown, in block diagram form, the basic optical components of a printing apparatus 10 in a prior art embodiment. In the apparatus of FIG. 1 there are three optical paths, one for each component color, typically red (R), green (G), and blue (B). In FIG. 1, similar components in each color path are labeled correspondingly with an appended r, g, or b. For red light, a light source 20*r* provides light at a red wavelength. Light source 20*r* may be, for example, a red LED or may be provided by a combination of a lamp and a red filter. Uniformizing optics 22*r* condition the red light and also provide pre-polarization for the incident red light. A polarization beamsplitter 24*r* then directs the s-polarized component of incident light onto a spatial light modulator 30*r*, such as an LCD or DMD. Spatial light modulator 30*r* modulates individual pixels of the incident light and reflects the modulated red light back out to polarization beamsplitter 24*r*. An X-cube 26 directs the modulated red light or the modulated green or modulated blue light into the optical path to provide a color image for exposure onto a photosensitive medium 32 at an image plane 36. A reel 34 is employed to store photosensitive medium 32 for printing by printing apparatus 10. Green and blue light follow similar paths to X-cube 26, with light radiation originating at green and blue light sources 20*g* and 20*b* respectively.

It must be noted that FIG. 1 shows how reflective LCDs would be used in printing apparatus 10. Transmissive LCDs could alternately be used. A transmissive LCD modulates a beam transmitted through the LCD. Thus, using a transmissive LCD, there is no need for folding the optical path between light source 20 and X-cube 26.

It is instructive to note that there are any number of other possible modifications and additions to the overall component arrangement of FIG. 1. It can be appreciated that there are particular benefits to modifications that eliminate components and simplify the optical path while maintaining acceptable performance.

Figure 2:
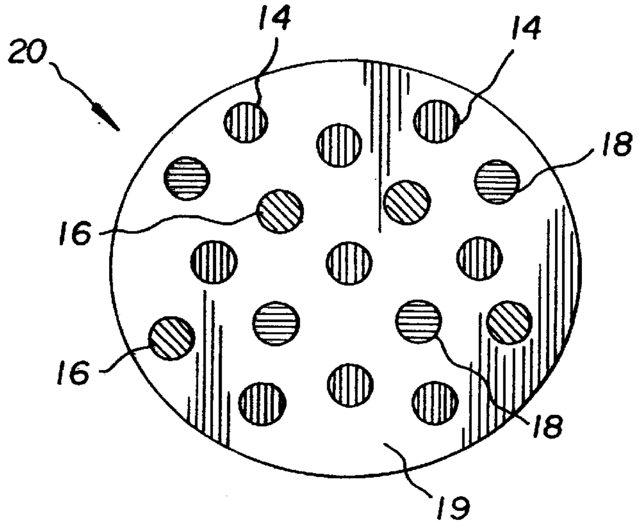
FIG. 2 (Prior Art)
FIG. 2 is a plane view of a light source member in a prior art embodiment.

Referring to FIG. 2, for example, there is shown one possible arrangement of LED components for single light source 20 that is capable of providing red and green and blue light. With the arrangement of FIG. 2, only those LEDs of a specific color are illuminated at any one time. The arrangement of FIG. 2 thus allows the light source 20 to separately provide illumination of each needed color, obviating the need for separate optical paths as required in prior art systems, as was shown in FIG. 1.

Light Source 20

Figure 3A:
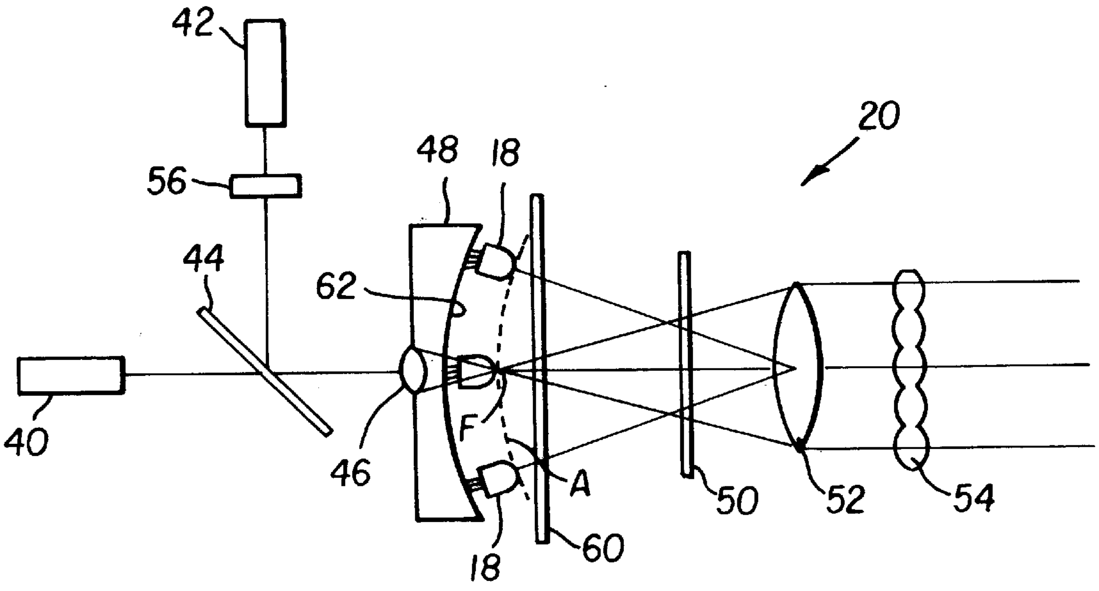
FIGS. 3*a* and 3*b* are diagrams showing the optical components in the hybrid light source apparatus of the present invention.

Referring to FIG. 3*a*, there is shown a block diagram view of light source 20 in a preferred embodiment of the present invention, whereby a single light source 20 could be used for sequentially providing all three RGB colors for printing apparatus 10. A red laser 40 directs red light through a dichroic mirror 44 to a lens 46. Lens 46 is mounted in an aperture within a housing 48, preferably having a curved surface 62, described subsequently. An optional speckle reduction device 50 removes speckle from the laser source. Speckle reduction device 50, which may be needed based on response characteristics of photosensitive medium 32, could be a diffuser or a device for providing beam deflection, such as an acousto-optical modulator, for example. Lens 52 and lenslet array 54 provide collimating and uniformizing optics for light source 20. As shown in FIG. 3*a*, the combination of lens 46 and 52 expand the beams from lasers 42 and 40.

Similarly, a green laser 42 directs green light through dichroic mirror 44 to lens 46. Speckle reduction device 50 acts to remove speckle from the green light, which is then provided to lens 52 and lenslet array 54. A shutter 56 is provided as an alternative device for shuttering green laser 42, since the response of green laser 42 may not be fast enough to allow successive RGB color imaging without some shuttering mechanism. Shutter 56 could be an acousto-optical modulator, for example. If red laser 40 is a laser diode, there is typically no need for shutter 56, since most red laser diodes respond quickly to changes in drive current.

Blue LEDs 18, mounted on housing 48, provide blue light for printing apparatus 10. A polarizer 60 is provided for light from blue LEDs 18. This blue light then follows the same optical path through lens 52 and uniformizing optics as was described for red and green light.

There are a number of ways in which the optical path can be optimized. For example, a preferred arrangement would be to have lens 46 and lens 52 share the same focal point, indicated as point F. This relationship would cause laser light directed through lens 52 to be collimated. In addition, there are advantages when LEDs 18 are disposed along a curved field, indicated as curved field A. The light output of LEDs 18 is then uniform across the field and directed toward lens 52. The radius of curved field A is preferably equal to the focal length of lens 52.

Using the arrangement of FIG. 3*a*, lasers 40 and 42 and blue LEDs 18 share the same optical path from lens 52 forward. For sequential RGB color imaging, these different color sources are multiplexed, so that light having only one color is directed through light source 20 at a time.

Sensitivity of Photosensitive Medium 32

Figure 4:
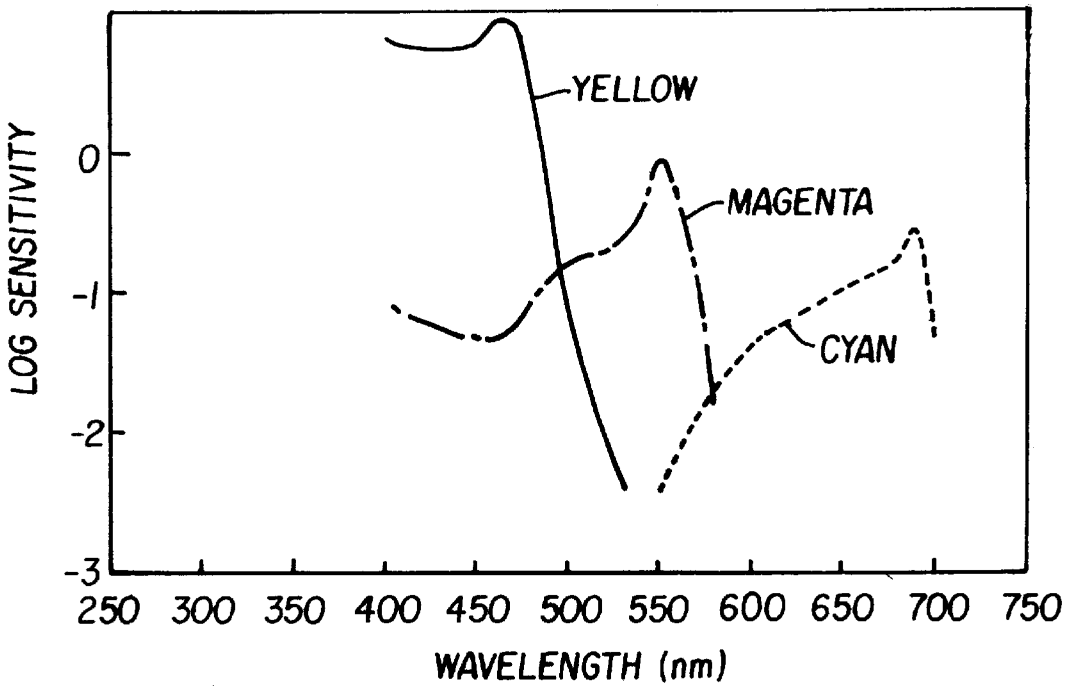
FIG. 4 (PRIOR ART)
FIG. 4 is an exemplary curve showing spectral sensitivity to wavelength for a motion picture intermediate film.

Referring to FIG. 4, there is shown a representative graph of log sensitivity vs. wavelength for a typical photosensitive medium 32. It must be emphasized that since the ordinate of graph of FIG. 4 shows the log of sensitivity, slight differences in height on this graph represent sizable differences in actual sensitivity response. It is also to be noted that, for each component color, the response of this photosensitive medium 32 is markedly peaked at a particular wavelength. This type of response is ideally suitable for lasers, due to the inherently tight laser bandwidths.

Complementary colors are represented in the chart of FIG. 4. The graph labeled as yellow in FIG. 4 indicates blue sensitivity. Similarly, the graph labeled magenta corresponds to green sensitivity; the graph labeled cyan corresponds to red sensitivity. Thus, for example, the specific type of photosensitive medium 32, shown in FIG. 6, graphed in FIG. 4 is least sensitive to red illumination, most sensitive to blue illumination.

Housing 48 and Polarizer 60

Figure 3B:
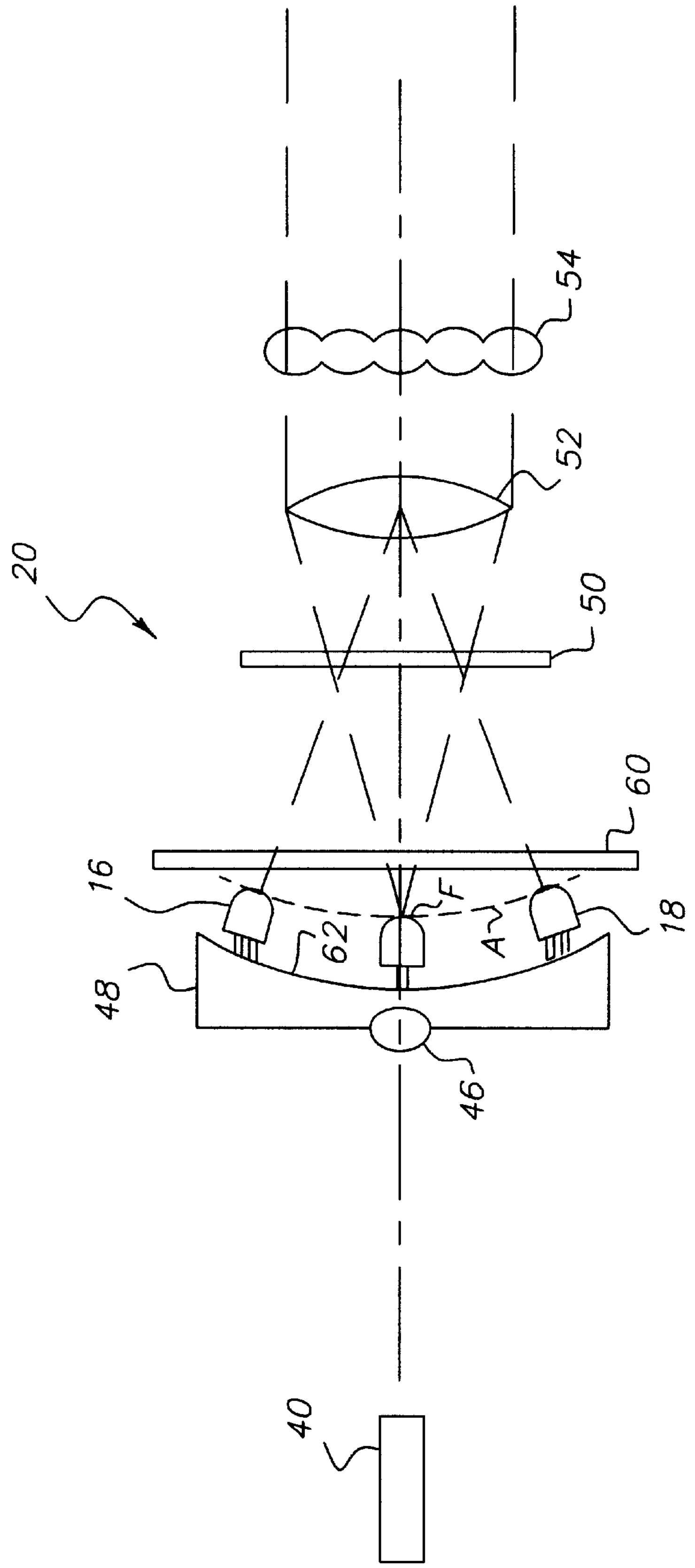
Figure 5A:
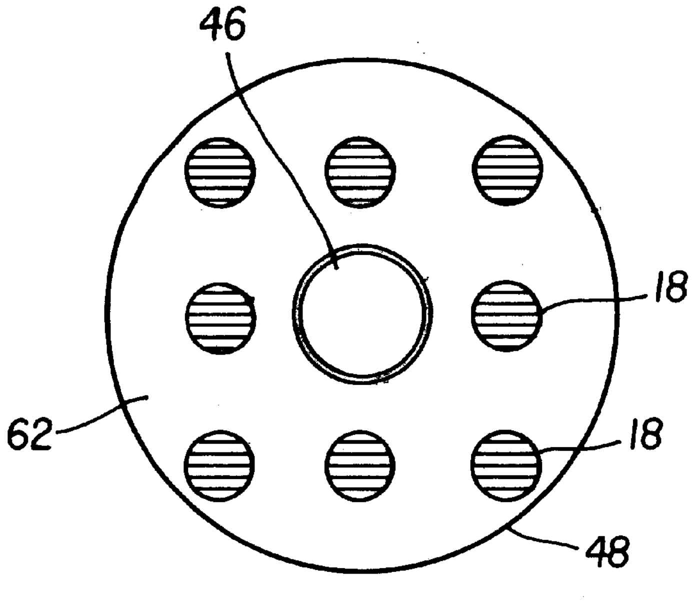
FIG. 5*a* is a plane view of a light source mounting member comprising a plurality of LEDs and an aperture with lens for a laser source.

Referring to FIG. 5*a,* there is shown a plane view of curved surface 62 of housing 48 that holds blue LEDs 18 and lens 46. Lens 46, comparable in performance to a microscope objective lens, is mounted within an aperture 48 so that it is disposed along the optical axis for light source 20. Lasers 40 and 42 are directed through lens 46, along its optical axis. Referring back to FIG. 3, curved surface 62 has a substantially spherical curvature, having a center of curvature on the optical axis near the center of lens 52. With this configuration, the light from blue LEDs 18 is directed toward the optical axis, to provide maximum brightness to lens 52.

Figure 5B:
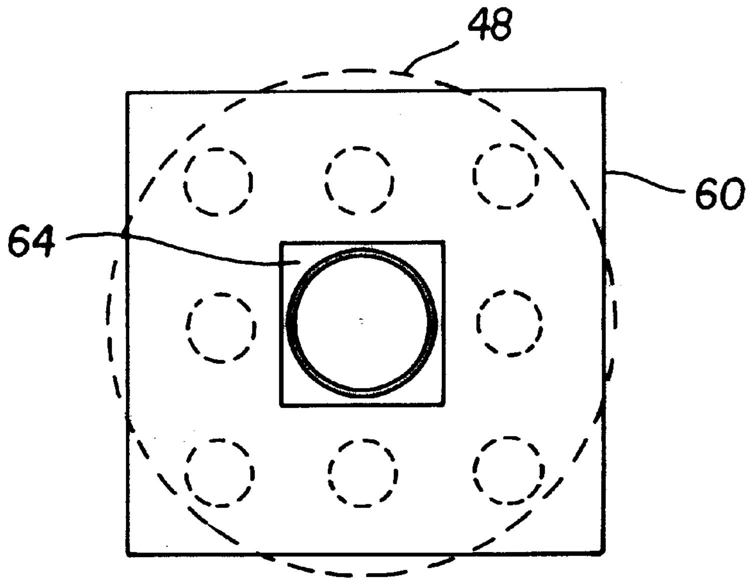
FIG. 5*b* is a plane view showing the relationship of a polarization plate to the light source mounting member in the optical path.

Referring to FIG. 5*b,* there is shown a plane view of polarizer 60 as viewed looking back toward mounting 18. Polarizer 60 is needed only for light emitted from blue LEDs 18. An opening 64 in polarizer 60 allows light from red laser 40 or green laser 42 to bypass polarization conditioning.

Printing Apparatus 10 in Preferred Embodiment

Figure 6:
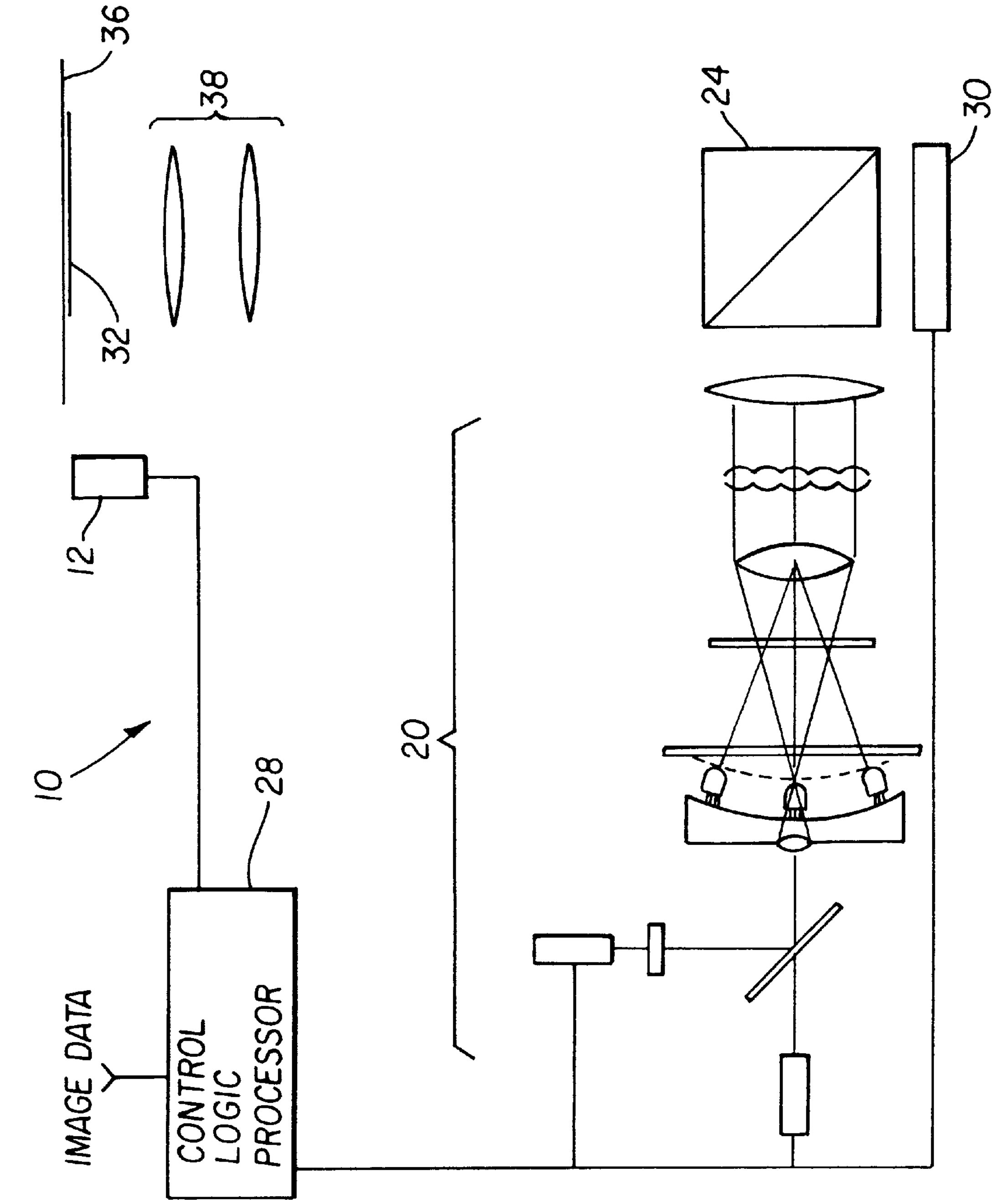
FIG. 6 is a block diagram showing the imaging apparatus of the present invention.

Referring to FIG. 6, there is shown a block diagram of printing apparatus 10 in a preferred embodiment. In contrast to the prior art printing apparatus 10 of FIG. 1, it can be seen that only one light source 20 is employed in the preferred embodiment, where light source 20 sequentially provides successive red, green, and blue light for exposure of photosensitive medium 32. A control logic processor 28 controls the sequencing of red, green, and blue light sources, thus allowing a single spatial light modulator 30 to serve for forming the red, green, and blue components of each color image. Focusing optics 38 serve to focus the image from spatial light modulator 30, transmitted through polarization beamsplitter, to image plane 36.

An optional sensor 12 may be provided to obtain information about photosensitive medium 32. This information can be used by control logic processor 28 to change the behavior of light source 20 appropriately. By way of example, and not by way of imitation, Table 1 lists a representative number of possible sensors 12 and the corresponding encoding provided with photosensitive medium 32.

TABLE 1

Encoding and Sensor Possibilities

| Where encoding has the form: | Sensor 12 would be: |
|---|---|
| Barcode or other optical encoding | Barcode reader or other optical reader, such as built-in or hand-held scanner. |
| Transponder containing a memory that includes identifying data for the media, such as an RF transponder, "SAMPT" (Selective Addressable Multi-Page Transponder), part number "RI-TRP-IR2B" available from Texas Instruments, Incorporated. | Transceiver, such as an RF transceiver, for example, "Model S2000" ™ transceiver, available from Texas Instruments, Incorporated, located in Dallas, Texas, USA. |
| Magnetically encoded strip | Magnetic strip reader |
| Memory device, such as an I-button, manufactured by Dallas Semiconductor Corp., Dallas, TX | I-button reader |

Encoding could be printed or attached to photosensitive medium 32 packaging or could be provided from a network connection or could be manually entered by an operator. Using this option with the preferred embodiment, upon sensing media 32 type, control logic processor 28 would respond by employing the proper LUTs and voltage bias value settings for the photosensitive medium 32.

Color-Sequential Operation

As synchronized by control logic processor 28 which provides image frames of successive color components in order, spatial light modulator 30 forms images in color-sequential fashion in printing apparatus 10 of the present invention. Thus, for example, spatial light modulator 30 forms the red component of an image frame when provided the data for the red component and illuminated by the red color source, then forms the green component when provided the data for the green component and illuminated by the green color source, and then forms the blue component when provided the data for the blue component and illuminated by the blue component source. This pattern repeats, red, green and blue for each successive frame. For each separate component color, control logic processor 28 configures spatial light modulator 30 with a different set of parameters, such as voltage bias level. In this way, spatial light modulator 30 adjusts its behavior for each component color.

In this color-sequential operation, the image data processed by control logic processor 28 can also be conditioned using a separate Look-Up Table (LUT) for each color. Thus, printing apparatus 10 is able to optimize color printing for each component color. Typically, component colors are R, G, and B; however, the method and apparatus of the present invention could be readily adapted to an alternate color sequence.

Optical Component Selection and Options

Referring back to FIG. 4, it is clear that light source 20 is capable of most efficient performance when matched to specific wavelengths for photosensitive medium 32.

In a preferred embodiment, the laser and LED components used within light source 20 are as listed in Table 2. However, these devices are by way of example only; any number of other suitable devices could be substituted. It might be advantageous to allow IR light sources, for example, to be used within light source 20.

TABLE 2

Components for Preferred Embodiment

| Component | Example |
|---|---|
| red laser 40 | Mitsubishi 1413R01 from Mitsubishi Electric Corporation, Semiconductor Group. |
| green laser 42 | Crystalaser GCL Series Diode-pumped green laser from CrystaLaser, Reno, NV. |
| blue LED 18 | Nichia NSPB 500S from Nichia America Corp., Mountville, PA. |

In the preferred embodiment, lenslet array 54 performs the field uniformizing function that is generally performed by uniformizing optics as was described for FIG. 1. Uniformizing optics could have any of a number of alternate configurations. Typically, some combination of lenslet arrays 54 and field lenses provides the uniform brightness necessary for acceptable imaging. Uniformizing optics might alternately or additionally comprise an integrator bar or hollow integrator, as is disclosed in U.S. Pat. No. 6,005,722.

Photosensitive Medium 32

In the preferred embodiment, printing apparatus 10 using the hybrid light source of the present invention is particularly suited to high-speed motion picture film imaging applications. Photosensitive medium 32 could be an intermediate negative film for motion picture production, such as Eastman EXR Color Intermediate Film EK 5244, manufactured by Eastman Kodak Company, Rochester, N.Y. Alternately, photosensitive medium 32 could be a print film, such as KODAK VISION Premier Color Print Film/2393, also manufactured by Eastman Kodak Company, Rochester, N.Y.

However, the present invention is applicable to a broader range of imaging apparatus. Photosensitive medium 32 can be more broadly interpreted to include any of a number of types of sensitized film or paper having photosensitive emulsions that respond to image-bearing light. Photosensitive medium 32 could be, for example, a reversal film medium that is positive-acting, so that increasing levels of exposure cause decreasing film densities. Examples of reversal film media include conventional slide film, such as Kodachrome and Ektachrome slide films manufactured by Eastman Kodak Company, Rochester, N.Y. Photosensitive medium 32 can also include an intermediate surface used for forming a color image such as, for example, an electrophotographic imaging medium. Photosensitive medium could alternately comprise an electronic photosensor array or grid employed as a component in an imaging path. Photosensitive medium 32 could also be a dry process media type.

Printing apparatus 10 of the present invention could be configured to be adaptable to more than one type of photosensitive medium 32. Depending on the photosensitive medium 32 type, different lasers could be switched into the optical path, or a different number of LEDs could be energized in order to provide the necessary exposure energy from light source 20. Referring back to FIG. 6, printing apparatus 10 could be configured with optional sensor 12 to automatically sense the type of photosensitive medium 32 or to sense characteristics stored with photosensitive medium 32 at manufacture, for example. Sensing of medium 32 type or of media sensitometry characteristics could employ optical, magnetic, mechanical, or RF sensors, for example. Sensor 12 would thus be able to detect and interpret information coupled to photosensitive medium 32, whether attached to or printed on medium 32 itself or stored on or within media 32 packaging components. In this way, printing apparatus 10 could be automatically configured to adapt to differences between different types of photosensitive media 32 or even between different media batches.

Alternate Embodiments

The present invention admits a number of alternate embodiments. For example, hybrid light source 20 could alternately use a single laser 40 for one color and LEDs for one or two other colors 16, 18. See FIG. 3*b*. In order for this arrangement to be practical, it would be necessary to have LEDs with sufficient brightness to be practical for high speed imaging and available at the proper wavelengths for photosensitive medium 32.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is a printing apparatus having a hybrid light source that is adapted to the sensitometric characteristics of a photosensitive medium.

PARTS LIST

| | |
|---|---|
| 10. | Printing aparatus |
| 12. | Sensor |
| 14. | Red LED |
| 16. | Green LED |
| 18. | Blue LED |
| 20. | Light source |
| 20r. | Red light source |
| 20g. | Green light source |
| 20b. | Blue light source |
| 22r. | Uniformizing optics for red optical path |
| 22g. | Uniformizing optics for green optical path |
| 22b. | Uniformizing optics for blue optical path |
| 24r. | Polarization beamsplitter for red optical path |
| 24g. | Polarization beamsplitter for green optical path |
| 24b. | Polarization beamsplitter for blue optical path |
| 26. | X-cube |
| 28. | Control logic processor |
| 30. | Spatial light modulator |
| 30r. | Spatial light modulator for red optical path |
| 30g. | Spatial light modulator for green optical path |
| 30b. | Spatial light modulator for blue optical path |
| 32. | Photosensitive medium |
| 34. | Reel |
| 36. | Image plane |
| 38. | Focusing optics |
| 40. | Red laser |
| 42. | Green laser |
| 44. | Dichroic mirror |

-continued

| PARTS LIST | |
|---|---|
| 46. | Lens |
| 48. | Housing |
| 50. | Speckle reduction device |
| 52. | Lens |
| 54. | Lenslet array |
| 56. | Shutter |
| 60. | Polarizer |
| 62. | Curved surface |
| 64. | Opening |

What is claimed is:

1. A writing apparatus for forming a color image from digital data onto a photosensitive medium, the apparatus comprising:

(a) a spatial light modulator comprising an array of pixel sites, each pixel site capable of modulating an incident light beam having a predetermined color in order to form an array of image pixels according to said digital data;

(b) a light source for providing said incident light beam, said light source comprising:

(b1) a first laser for emitting said incident light beam having a first color;

(b2) a second laser for emitting said incident light beam having a second color;

(b3) a concave LED array for emitting said incident light beam having a third color;

(c) wherein beams from said first and second lasers are on a common optical axis; and (d) wherein said common axis is at a center of said LED array.

2. The writing apparatus of claim 1 wherein said photosensitive medium is a negative film.

3. The writing apparatus of claim 1 wherein said photosensitive medium is a print film.

4. The writing apparatus of claim 1 wherein said photosensitive medium is a reversal film.

5. The writing apparatus of claim 1 wherein said photosensitive medium is an electrophotographic medium.

6. The writing apparatus of claim 1 wherein said photosensitive medium is an electronic photosensor.

7. The writing apparatus of claim 1 wherein said photosensitive medium is a dry process media.

8. The writing apparatus of claim 1 wherein said first color is red.

9. The writing apparatus of claim 1 wherein said second color is green.

10. The writing apparatus of claim 1 wherein said third color is blue.

11. The writing apparatus of claim 1 wherein said spatial light modulator is a liquid crystal device.

12. The writing apparatus of claim 11 wherein said liquid crystal device is transmissive.

13. The writing apparatus of claim 11 wherein said liquid crystal device is reflective.

14. The writing apparatus of claim 1 wherein said spatial light modulator is a digital micromirror device.

15. The writing apparatus of claim 1 wherein said spatial light modulator is a gated light valve.

16. The writing apparatus of claim 1 wherein said light source further comprises a polarizer, said polarizer configured to polarize said third color.

17. The writing apparatus of claim 1 wherein said light source further comprises a speckle reduction device.

18. The writing apparatus of claim 17 wherein said speckle reduction device is a holographic diffuser.

19. The writing apparatus of claim 17 wherein said speckle reduction device comprises an acousto-optic modulator.

20. The writing apparatus of claim 1 wherein said light source further comprises:

(b4) a third laser for emitting said incident light beam as an infrared beam.

21. The writing apparatus of claim 1 wherein said light source further comprises a shutter mechanism.

22. The writing apparatus of claim 1 further comprising a sensor for sensing information coupled with said photosensitive medium.

23. The writing apparatus of claim 22 wherein said sensor is an RF sensor.

24. The writing apparatus of claim 22 wherein said sensor is an optical sensor.

25. The writing apparatus of claim 22 wherein said sensor is a magnetic sensor.

26. The writing apparatus of claim 22 wherein said sensor is a mechanical sensor.

27. The writing apparatus of claim 22 wherein said information obtained from said sensor conditions said incident beam emitted from said light source.

28. The writing apparatus of claim 1 wherein a center of curvature of said LED array is along said common optical axis.

29. A writing apparatus for forming a color image from digital data onto a photosensitive medium, the apparatus comprising:

(a) a spatial light modulator comprising an array of pixel sites, each pixel site capable of modulating an incident light beam having a predetermined color in order to form an array of image pixels according to said digital data; and (b) a light source for providing said incident light beam, said light source comprising:

(b1) a laser for emitting said incident light beam having a first color;

(b2) concave LED array comprising at least one second color LED for emitting said incident light beam having a second color at least one third color LED for emitting said incident light beam having a third color; and (c) wherein a center of curvature of said LED array share a common optical axis with said laser.

30. The writing apparatus of claim 29 wherein said photosensitive medium is a negative film.

31. The writing apparatus of claim 29 wherein said photosensitive medium is a print film.

32. The writing apparatus of claim 29 wherein said photosensitive medium is a reversal film.

33. The writing apparatus of claim 29 wherein said photosensitive medium is an electrophotographic medium.

34. The writing apparatus of claim 29 wherein said photosensitive medium is an electronic photosensor.

35. The writing apparatus of claim 29 wherein said photosensitive medium is a dry process medium.

36. The writing apparatus of claim 29 wherein said first color is red.

37. The writing apparatus of claim 29 wherein said second color is green.

38. The writing apparatus of claim 29 wherein said third color is blue.

39. The writing apparatus of claim 29 wherein said spatial light modulator is a liquid crystal device.

40. The writing apparatus of claim 39 wherein said liquid crystal device is transmissive.

41. The writing apparatus of claim 39 wherein said liquid crystal device is reflective.

42. The writing apparatus of claim 29 wherein said spatial light modulator is a digital micromirror device.

43. The writing apparatus of claim 29 wherein said spatial light modulator is a gated light valve.

44. The writing apparatus of claim 29 wherein said light source further comprises a polarizer, said polarizer configured to polarize said second color and said third color.

45. The writing apparatus of claim 29 wherein said light source further comprises a speckle reduction device for reducing speckle from said laser.

46. The writing apparatus of claim 29 wherein said speckle reduction device is a holographic diffuser.

47. The writing apparatus of claim 29 wherein said light source further comprises:

(b3) a second laser for emitting said incident light beam as an infrared beam.

48. The writing apparatus of claim 45 wherein said speckle reduction device comprises an acousto-optic modulator.

49. The writing apparatus of claim 29 further comprising a sensor for sensing information coupled with said photosensitive medium.

50. The writing apparatus of claim 49 wherein said sensor is an RF sensor.

51. The writing apparatus of claim 49 wherein said sensor is an optical sensor.

52. The writing apparatus of claim 49 wherein said sensor is a magnetic sensor.

53. The writing apparatus of claim 49 wherein said sensor is a mechanical sensor.

54. The writing apparatus of claim 49 wherein said information obtained from said sensor conditions said incident beam emitted from said light source.

55. The writing apparatus of claim 29 wherein said light source comprises a shutter mechanism.

56. In a writing apparatus that uses a spatial light modulator for forming an image from digital data onto a photosensitive medium, a method for providing a light beam having a predetermined color adapted to sensitometric characteristics of the photosensitive medium, the method comprising:

(a) providing a first laser for emitting said light beam having a first color;

(b) providing a second laser for emitting said light beam having a second color;

(c) providing an LED curved array for emitting said light beam having a third color;

(d) wherein said first and second color light beams are on a common optical axis; and (e) wherein said common axis is at a center of said LED array.

57. The method of claim 56 further comprising the steps of:

(d) providing a sensor for sensing information coupled to the photosensitive medium; and (e) conditioning said light beam according to said information.

58. The method of claim 56 wherein the step of providing a first laser further comprises the step of providing a shutter mechanism.

59. The method of claim 58 wherein the step of providing a sensor comprises the step of providing an RF sensor.

60. The method of claim 58 wherein the step of providing a sensor comprises the step of providing an optical sensor.

61. The method of claim 58 wherein the step of providing a sensor comprises the step of providing a magnetic sensor.

62. The method of claim 58 wherein the step of providing a sensor comprises the step of providing a mechanical sensor.

63. The method of claim 56 further comprising the step of providing a speckle reduction device for reducing speckle from said first laser and/or from said second laser.

64. The method of claim 63 wherein the step of providing a speckle reduction device comprises the step of providing a holographic diffuser.

65. The method of claim 63 wherein the step of providing a speckle reduction device comprises the step of providing an acousto-optic modulator.

66. In a writing apparatus that uses a spatial light modulator for forming an image from digital data onto a photosensitive medium, a method for providing a light beam having a predetermined color adapted to sensitometric characteristics of the photosensitive medium, the method comprising:

(a) providing a first laser for emitting said light beam having a first color;

(b) providing a curved LED array comprising at least one second color LED for emitting said light beam having a second color and at least one third color LED for emitting said light beam having a third color; and (c) wherein a center of curvature of said LED array shares a common optical axis with said first laser.

67. The method of claim 66 further comprising the steps of:

(d) providing a sensor for sensing information coupled to the photosensitive medium; and (e) conditioning said light beam according to said information.

68. The method of claim 66 wherein the step of providing a first laser further comprises the step of providing a shutter mechanism.

69. The method of claim 66 further comprising the step of providing a speckle reduction device for reducing speckle from said first laser and/or from said second laser.

70. The method of claim 69 wherein the step of providing a speckle reduction device comprises the step of providing a holographic diffuser.

71. The method of claim 70 wherein the step of providing a sensor comprises the step of providing an RF sensor.

72. The method of claim 70 wherein the step of providing a sensor comprises the of providing an optical sensor.

73. The method of claim 70 wherein the step of providing a sensor comprises the step of providing a magnetic sensor.

74. The method of claim 70 wherein the step of providing a sensor comprises the step of providing a mechanical sensor.

75. The method of claim 69 wherein the step of providing a speckle reduction device comprises the step of providing an acousto-optic modulator.

* * * * *